(12) United States Patent
Koizumi

(10) Patent No.: US 6,666,742 B2
(45) Date of Patent: Dec. 23, 2003

(54) CONTROLLING LIGHT DISCHARGED BY A PHOSPHORESCENT MATERIAL

(75) Inventor: David H. Koizumi, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 10/454,219

(22) Filed: Jun. 4, 2003

(65) Prior Publication Data

US 2003/0194944 A1 Oct. 16, 2003

Related U.S. Application Data

(62) Division of application No. 09/785,917, filed on Feb. 17, 2001, now Pat. No. 6,595,826.

(51) Int. Cl.[7] .............................. A63H 33/22; F21K 2/00
(52) U.S. Cl. ........................ 446/219; 446/146; 40/442; 362/34
(58) Field of Search .............................. 40/442; 362/34; 446/146, 219

(56) References Cited

U.S. PATENT DOCUMENTS

| | | | | |
|---|---|---|---|---|
| 4,016,450 A | * | 4/1977 | Balekjian | |
| 4,590,381 A | * | 5/1986 | Mendelson | |
| 5,308,546 A | * | 5/1994 | Hansen et al. | |
| 5,480,338 A | * | 1/1996 | Barthold | |
| 5,649,827 A | * | 7/1997 | Suzaki | |
| 6,168,853 B1 | * | 1/2001 | Feng et al. | |

OTHER PUBLICATIONS

Y. Yanagisawa et al., Enhanced Photon Emission During Hydrogen Adsorption on UV–Excited MgO Surfaces. Journal of the Physical Society of Japan, Jan. 1984, vol. 53, No. 1, pp. 66–69.*

* cited by examiner

Primary Examiner—John A. Ricci
(74) Attorney, Agent, or Firm—Trop, Pruner & Hu, P.C.

(57) ABSTRACT

A material that phosphoresces may be controlled and the phosphorescence may be terminated when desired. A phosphorescing material may be exposed to an energy source that causes the material to stop phosphorescing. Thus, a pattern may be written on a surface, which is phosphorescing using a coherent energy source. The written pattern, represented by darkened regions, may be recognized by users as a symbol, a graphics or text.

6 Claims, 2 Drawing Sheets

CONTROLLING LIGHT DISCHARGED BY A PHOSPHORESCENT MATERIAL

This is a divisional of prior application Ser. No. 09/785,917 filed Feb. 17, 2001 now U.S. Pat. No. 6,595,826.

BACKGROUND

This invention relates generally to phosphorescent materials.

Materials that are phosphorescent glow in the dark after being exposed to an energy source generating sufficient energy to create phosphorescence. Phosphorescence is the result of electrons associated with molecules changing orbitals in a fashion, which results in the generation of light. Some phosphorescent materials glow after being exposed to energy in the ultraviolet range. Since sunlight may include sufficient ultraviolet energy, sunlight exposure may be sufficient to cause some materials, such as zinc sulfide, to glow.

As one example, zinc sulfide, after having been exposed to ultraviolet light, may emit a pale green light for a period of up to eight hours. Thus, zinc sulfide is utilized in a variety of products including children's glowing toys and dolls, as well as a variety of non-toy products including signs and safety equipment.

Phosphorescent materials may be provided in the forms of paints, pigments, and films. Many of these films are utilized as lambertian backgrounds to uniformly light displays while others may be used for foreground elements such as shapes or text. Phosphors are available that emit a wide variety of colored light when exposed to energy within a phosphor's absorption band.

Among the known phosphorescent materials are ZnS (green), $CaAl_2O_4$ (blue), $SR_4Al_{14}O_{25}$ (blue-green), $SRAl_2O_4$ (green), and $Y_2O_2S$ (orange-yellow). Each of these phosphorescent materials may emit different wavelengths of light and yet may require different energy levels in order to initiate phosphorescence. Moreover, the period of time that they phosphoresce after being exposed to sufficient energy may vary.

Typically phosphorescent materials are considered "one way" materials—they may be turned on to phosphoresce. It is then generally considered that these materials will continue to phosphoresce until such time as they reach their ground state. Generally, it is believed that this period of phosphoresce is a function of the characteristics of the material.

Thus, there is a need for better ways to control phosphorescent materials and particularly better ways to control the way that these materials phosphoresce.

DETAILED DESCRIPTION

Figure 1:
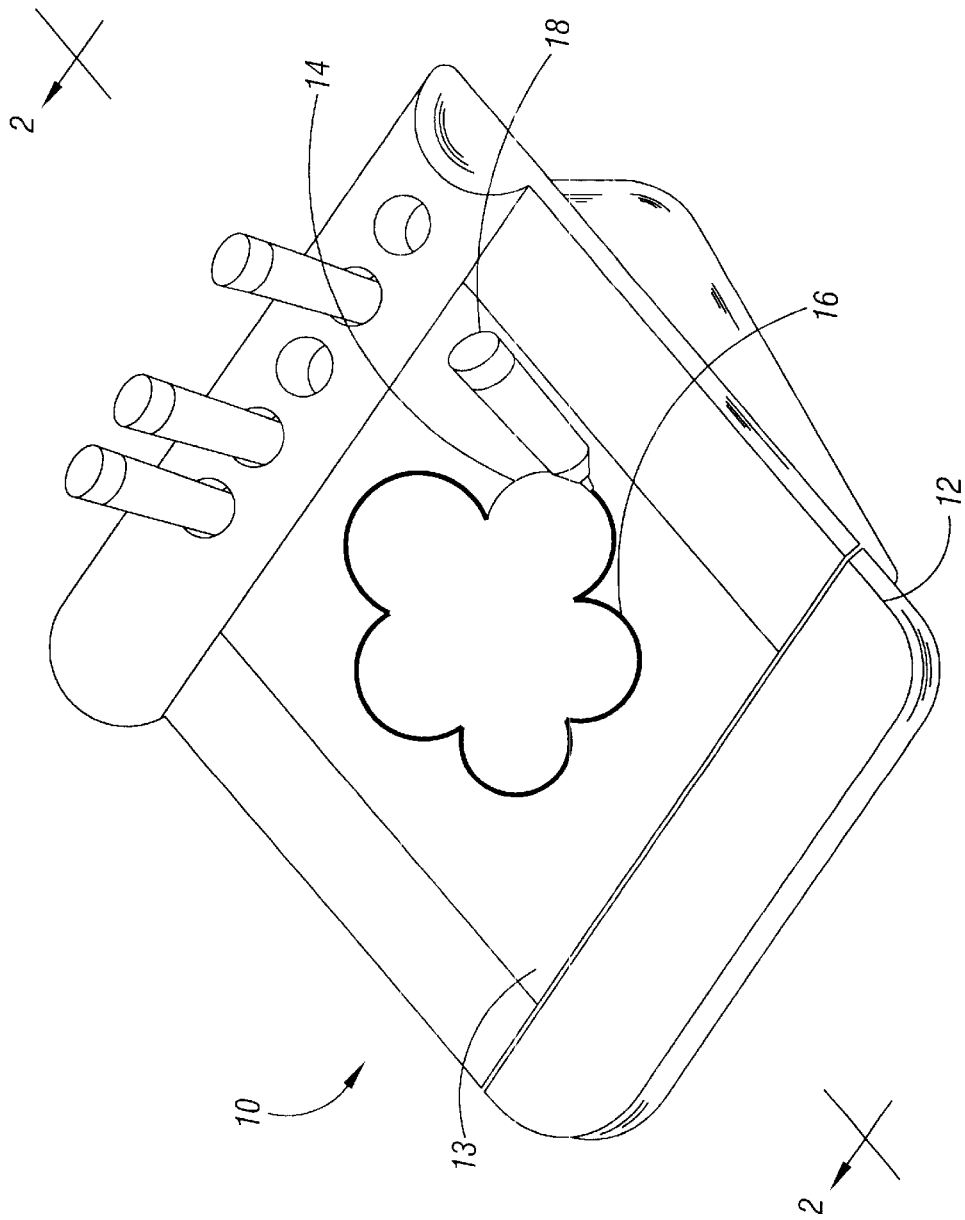
FIG. 1 is a perspective view of one embodiment of the present invention.

Referring to FIG. 1, one application of the principles set forth herein is in connection with a wide variety of toys. As a toy example, shown in FIG. 1, a drawing toy 10 may include a housing 12 with an inclined drawing surface 13. A child may use an erasable marker 18 to draw on the drawing surface 13. However, in this embodiment, the child's drawing may be guided by a pattern 14 that has been formed on the drawing surface 13 to guide the child's depiction of the object. Thereby, the child may simply trace over the pattern 14 to create a suitable design on the toy 10.

Figure 2:
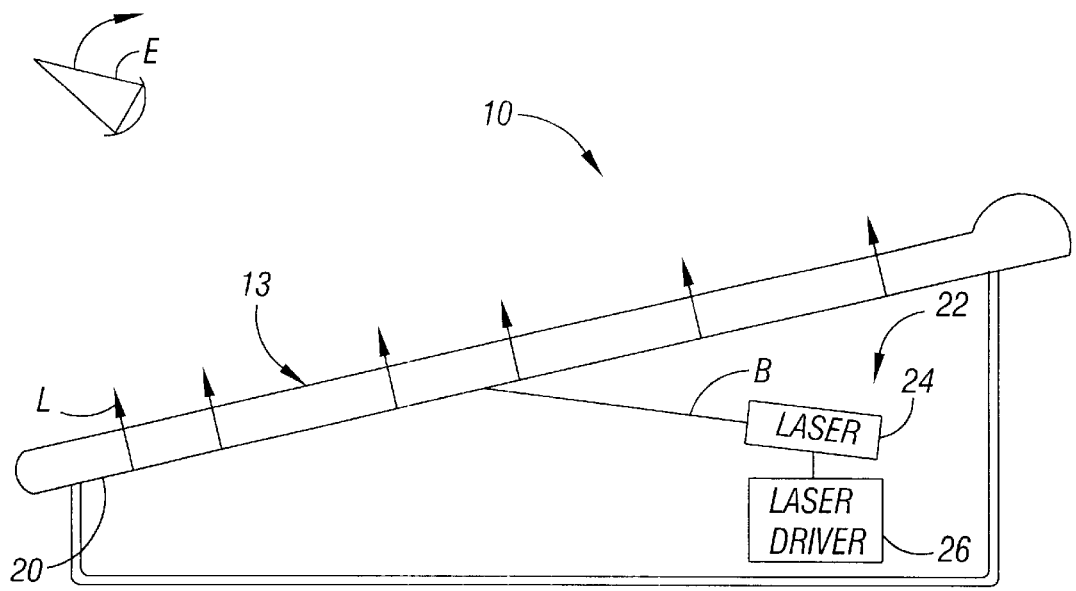
FIG. 2 is an enlarged cross-sectional view taken generally along the line 2—2 in FIG. 1.

Turning to FIG. 2, the child's eye, indicated as E, may view the drawing surface 13 from one side. On the opposite side of the surface 13 may be coated a phosphorescent layer or film 20. In one embodiment, the layer 20 may be opaque. The layer 20 may be formed of any phosphorescent material that glows for an extended amount of time in one embodiment. In one embodiment, the surface 13 may be formed of a transparent material such as a plastic sheet having the phosphorescent layer 20 merely coated on one side.

When the phosphorescent layer 20 is exposed to a sufficient energy source, it will emit light as indicated at L. The layer 20 will continue to glow, enabling the surface 13 to glow in the dark. As one example, the layer 20 may be zinc sulfide.

An energy source 22 may include a laser 24 and a laser driver 26, which positions the beam B of the laser 24 at a desired position on the surface 13. The laser 24 may generate a light beam B of insufficient energy to cause the layer 20 to glow but of sufficient energy to actually discharge the layer 20 and to thereby terminate or accelerate the phosphorescence of the layer 20. When exposed to energy of appropriate frequency characteristics, the glowing layer 20 may emit the remaining energy in the form of a flash of light, thereafter extinguishing the glowing light emission.

In this way, the laser beam B may be driven across the surface 13 by the laser driver 26 in two dimensions to draw features on the surface 13 in one embodiment. The laser 24 may do this by exposing the glowing layer 20 to energy that causes the glowing in the exposed spot to be extinguished. Thus, the surface 13 may continue to glow except for those regions exposed to the beam B which regions may go dark.

Figure 3:
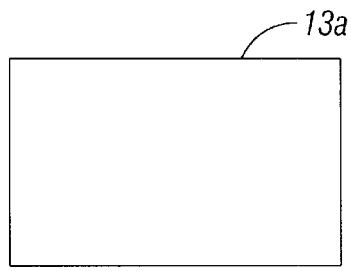
FIG. 3 is a depiction of the display screen of the device shown in FIG. 1 in one situation in accordance with one embodiment of the present invention.
Figure 4:
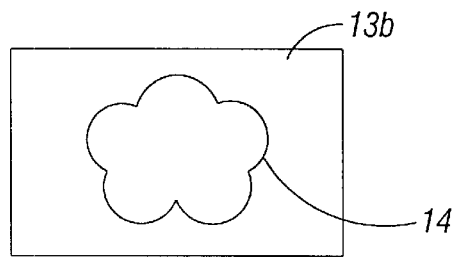
FIG. 4 is a depiction of the display screen shown in FIG. 3 in another situation in accordance with one embodiment of the present invention.

For example, referring to FIG. 3, the surface 13a may be entirely glowing, having been exposed to a sufficient energy source to initiate phosphorescence. For example, in the case of a layer 20 of zinc sulfide, exposure to ultraviolet light, such as sunlight, initiates phosphorescence. Thus, the entire surface 13 may glow.

However, when the layer 20 is exposed to the beam B produced by the laser 24 in a pattern 14, the portions of the surface 13b exposed to the light beam B no longer glow and appear relatively dark compared to the surrounding regions which continue to glow with pale green light.

In the case of a laser beam 24 that is a deep red laser having a wavelength of 6000 Angstroms, the phosphorescence may be caused to immediately discharge. It appears to discharge by emitting a flash of pale green light and then going dark. Thus, instead of continuing to glow for an extended period, such as eight hours as normally associated with zinc sulfide phosphorescence, the phosphorescence is caused to quickly or immediately terminate when the layer 20 is exposed to sufficient energy to discharge the energy responsible for phosphorescence.

It is believed that an energy source that does not deliver sufficient energy to cause phosphorescence but instead provides energy with the right frequency characteristics may immediately or substantially immediately terminate the phosphorescence of areas exposed to the energy source. If a relatively coherent light source is used to deliver the discharging energy, the phosphorescent layer 20 may be effectively written on since the unexposed regions of the phosphorescent layer 20 continue to phosphorescence while the exposed regions, which may be a relatively coherent dot, line or curve, may go dark.

In this way, the phosphorescence may be controlled to create a variety of visual effects. For example, in addition to children's toys, whiteboard images may be generated from a distance using a laser pointing device to write information on a glowing phosphorescent layer on the whiteboard. While relatively simple graphical symbols are illustrated in the figures in the present application, it may be possible in some applications to write relatively complex information including numbers and text using the discharging effect. For example, relatively low data rate displays may be implemented using the discharging technology.

With each phosphorescent material, a specific range or band of energy may be utilized to discharge the phosphorescence in the fashion described herein. That range or band will generally be less than the energy needed to initiate phosphorescence. It is believed that the discharging energy source "pushes" the remaining energized molecules over the activation energy barrier so that they quickly discharge, en masse, creating dark spots thereafter whose phosphorescence has been extinguished.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method comprising:
   exposing a phosphorescent material to an energy source to cause the material to phosphoresce; and
   exposing the phosphorescing material to an energy source to cause the material to stop phosphorescing.

2. The method of claim 1 wherein exposing the phosphorescing material to an energy source to cause the material to stop phosphorescing includes exposing the material to a coherent light source.

3. The method of claim 1 wherein exposing the phosphorescing material to an energy source to cause the material to stop phosphorescing includes exposing the material to an energy source generating less energy than the energy source used to cause the material to phosphoresce.

4. The method of claim 1 including exposing a phosphorescing material on one side of a transparent layer to a coherent light source to cause the material to stop phosphorescing and enabling a viewer to view the material through the transparent layer.

5. The method of claim 1 including driving a laser beam over a phosphorescing surface to cause the surface to stop phosphorescing.

6. The method of claim 1 including exposing a phosphorescing zinc sulfide layer to a red laser light to extinguish the phosphorescence.

* * * * *